(12) United States Patent
Kowarz (10) Patent No.: US 6,724,515 B1
(45) Date of Patent: Apr. 20, 2004

(54) CONFORMAL GRATING DEVICE FOR PRODUCING ENHANCED GRAY LEVELS

(75) Inventor: Marek W. Kowarz, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/335,645

(22) Filed: Dec. 31, 2002

(51) Int. Cl.⁷ .............................................. G02B 26/00
(52) U.S. Cl. ...................... 359/290; 359/295; 359/231
(58) Field of Search ................. 359/290, 231, 359/291, 292, 295, 572, 573

(56) References Cited

U.S. PATENT DOCUMENTS

| | | | |
|---|---|---|---|
| 5,668,611 A | 9/1997 | Ernstoff et al. | 348/771 |
| 5,812,303 A | 9/1998 | Hewlett et al. | 359/298 |
| 5,903,323 A | 5/1999 | Ernstoff et al. | 348/771 |
| 6,144,481 A | 11/2000 | Kowarz et al. | 359/291 |
| 6,243,194 B1 * | 6/2001 | Brazas et al. | 359/290 |
| 6,307,663 B1 | 10/2001 | Kowarz | 359/231 |
| 6,411,425 B1 | 6/2002 | Kowarz et al. | 359/291 |
| 6,476,848 B2 | 11/2002 | Kowarz et al. | 347/255 |

OTHER PUBLICATIONS

Kowarz et al., "Conformal Grating Electromechanical System (GEMS) For High–Speed Digital Light Modulation," IEEE 15th International MEMS Conference Technical Digest, pp. 568–573 (2002).

* cited by examiner

*Primary Examiner*—Scott J. Sugarman
*Assistant Examiner*—Richard Hanig
(74) *Attorney, Agent, or Firm*—Stephen H. Shaw (57) ABSTRACT

An electromechanical conformal grating device including: at least two sets of elongated ribbon elements; a pair of end supports for supporting each elongated ribbon element at both ends over a substrate; a plurality of intermediate supports placed under each elongated ribbon element; and at least two inputs for selectively applying a force to the at least two sets of elongated ribbon elements; wherein the force causes selected elongated ribbon elements to deform between first and second operating states, wherein during the second operating state the elongated ribbon elements mechanically conform to the intermediate supports.

46 Claims, 12 Drawing Sheets

CONFORMAL GRATING DEVICE FOR PRODUCING ENHANCED GRAY LEVELS

FIELD OF THE INVENTION

This invention relates to electromechanical grating devices for light modulation. More particularly, the invention relates to the formation of gray levels in a projection display system containing a linear array of electromechanical grating devices.

BACKGROUND OF THE INVENTION

Many projection display systems employ a spatial light modulator to convert electronic image information into an output image. At present in such systems, the light source is typically a white light lamp and the spatial light modulator is typically an area array containing liquid crystal devices or micromirror devices. Alternative display system architectures with one or more laser sources and spatial light modulators that are linear arrays of electromechanical grating devices show much promise for the future. To display high quality motion images, the individual devices of these different spatial light modulators must be capable of rapidly producing a large number of gray levels in the image. The limit on the number of possible gray levels is usually dictated either by the device dynamics or by the speed of electronic components within the display system.

Prior inventions have disclosed schemes for increasing the number of gray levels in the image without increasing the speed of the modulating elements or of the associated electronics. These schemes vary the illumination that is incident on the spatial light modulator during a frame. Specifically, according to U.S. Pat. No. 5,812,303, issued to Hewlett et al. on Sep. 22, 1998, entitled, "LIGHT AMPLITUDE MODULATION WITH NEUTRAL DENSITY FILTERS," additional gray levels can be obtained with a micromirror device by using a variable neutral density filter to generate bright and dark gray levels. The dark gray scale is obtained by attenuating the illumination for some time during the display of a frame. The bright gray scale has no attenuation. In practice, the invention is implemented by rotating a filter wheel with a multi-segment neutral density filter in synchronization with the data stream.

An alternative approach employs a pulsating light source such as a pulsed laser to reduce speed requirements on the electronic components, as described in U.S. Pat. No. 5,668,611, issued to Ermstoff et al. on Sep. 16, 1997, entitled "FULL COLOR SEQUENTIAL IMAGE PROJECTION SYSTEM INCORPORATING PULSE RATE MODULATED ILLUMINATION." The illumination on the spatial light modulator is adjusted by varying the pulse rate or pulse count. Moreover, the average brightness of the light source is determined by the number of pulses. A complementary method uses direct intensity modulation of the light source to obtain multiple levels of brightness, as disclosed in U.S. Pat. No. 5,903,323, issued to Ernstoff et al. on May 11, 1999, entitled "FULL COLOR SEQUENTIAL IMAGE PROJECTION SYSTEM INCORPORATING TIME MODULATED ILLUMINATION." Both U.S. Pat. No. 5,668,611 and U.S. Pat. No. 5,903,323 address the specific problem of having a large enough time window for the electronic components to load new image data bits into the spatial modulator.

Each of the above described inventions trade light source efficiency for improved gray levels or reduced electronic component speed requirements. However, efficient use of the light source is needed for high-quality projection displays in order to maximize brightness and color saturation of the projected image.

Recently, an electromechanical conformal grating device consisting of ribbon elements suspended above a substrate by a periodic sequence of intermediate supports was disclosed by Kowarz in U.S. Pat. No. 6,307,663, entitled "SPATIAL LIGHT MODULATOR WITH CONFORMAL GRATING DEVICE" issued Oct. 23, 2001. The electromechanical conformal grating device is operated by electrostatic actuation, which causes the ribbon elements to conform around the support substructure, thereby producing a grating. The device of '663 has more recently become known as the conformal GEMS device, with GEMS standing for grating electromechanical system. The conformal GEMS device possesses a number of attractive features. It provides high-speed digital light modulation with high contrast and good efficiency. In addition, in a linear array of conformal GEMS devices, the active region is relatively large and the grating period is oriented perpendicular to the array direction. This orientation of the grating period causes diffracted light beams to separate in close proximity to the linear array and to remain spatially separated thruoghout most of an optical system and enables a simpler optical system design with smaller optical elements. Display systems based on a linear array of conformal GEMS devices were described by Kowarz et al. in U.S. Pat. No. 6,411,425, entitled "ELECTROMECHANICAL GRATING DISPLAY SYSTEM WITH SPATIALLY SEPARATED LIGHT BEAM", issued Jun. 25, 2002 and by Kowarz et al. in U.S. Pat. No. 6,476,848, entitled "ELECTROMECHANICAL GRATING DISPLAY SYSTEM WITH SEGMENTED WAVEPLATE", issued Nov. 5, 2002.

Figure 1:
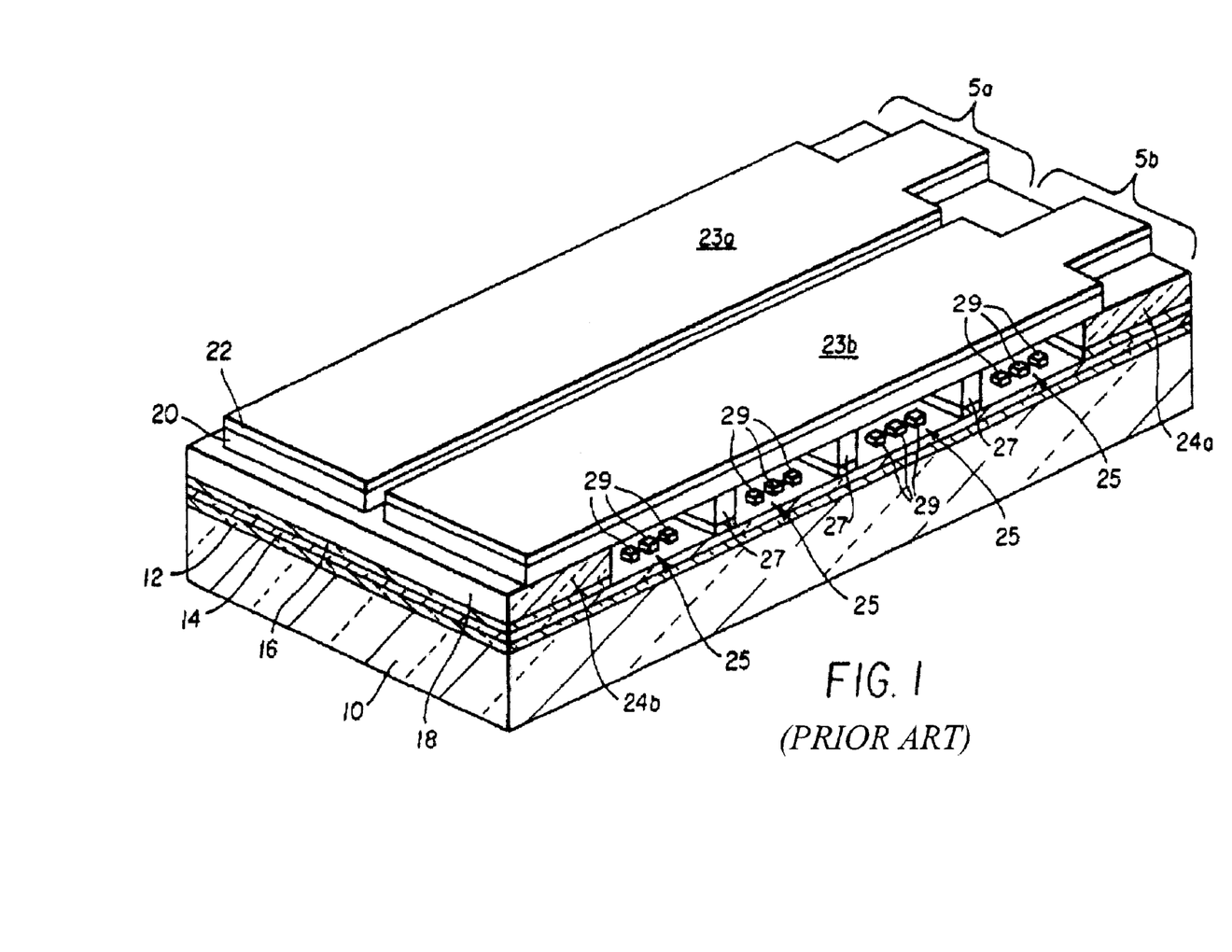
FIG. 1 is a prior art perspective, partially cut-away view of two conformal GEMS devices in a linear array.
Figure 2:
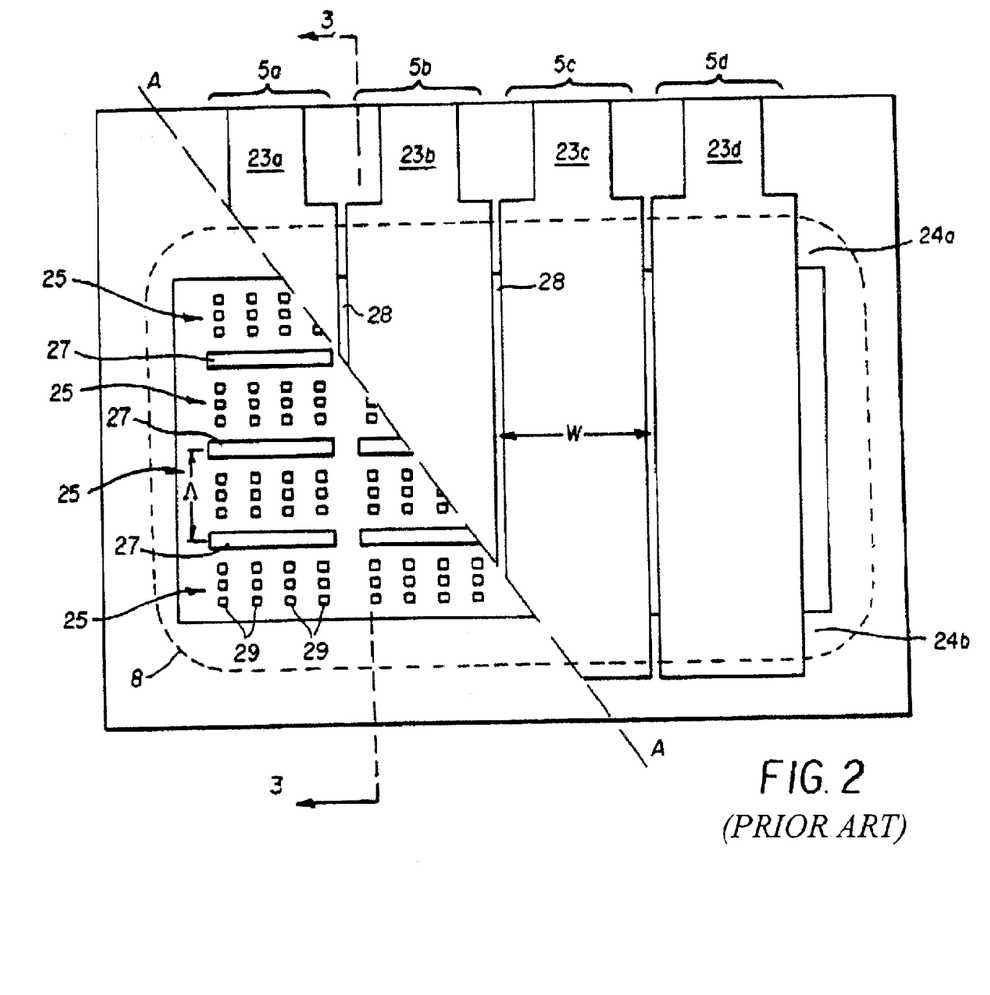
FIG. 2 is a prior art top view of four conformal GEMS devices in a linear array.
Figure 3A:
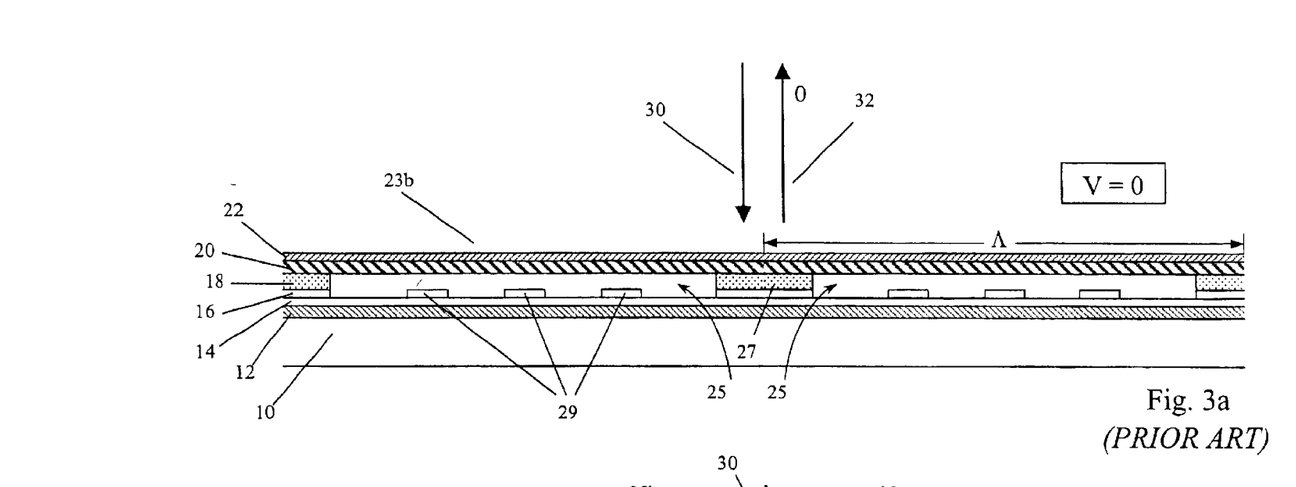
FIGS. 3a and 3b are prior art cross-sectional views through line 3—3 in FIG. 2, showing the operation of a conformal GEMS device in an unactuated state with V=0 and a fully actuated state with V=$V_{HIGH}$, respectively.
Figure 3B:
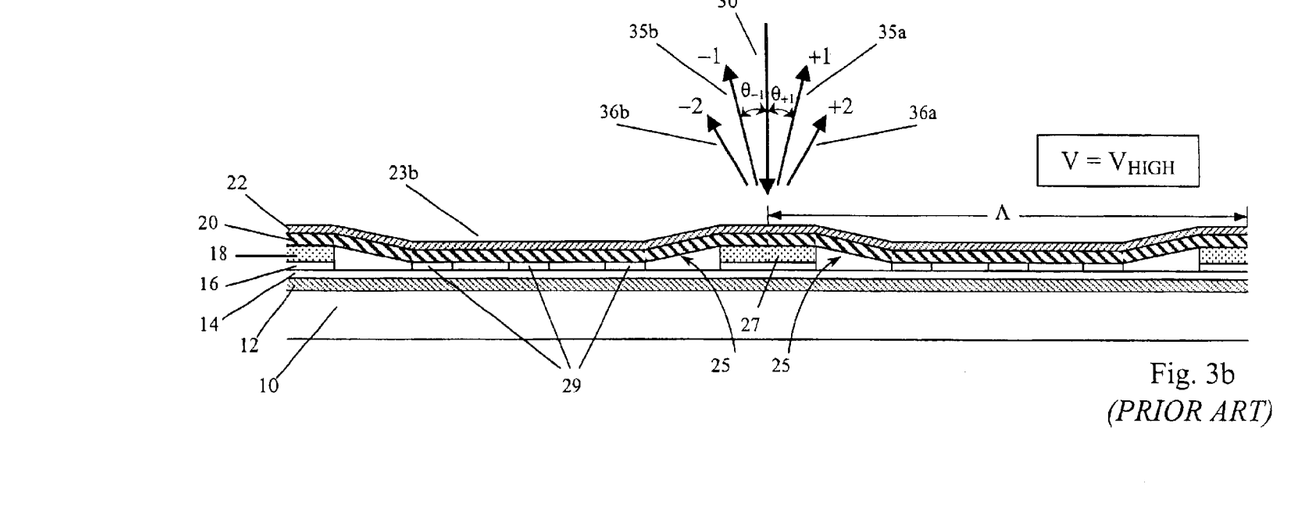

The conformal Grating Electromechanical System (GEMS) devices disclosed in U.S. Pat. No. 6,307,663 are illustrated in FIGS. 1–3. FIG. 1 shows two side-by-side conformal GEMS devices 5a and 5b in an unactuated state. The conformal GEMS devices 5a and 5b are formed on top of a substrate 10 covered by a bottom conductive layer 12, which acts as an electrode to actuate the devices 5a, 5b. The bottom conductive layer 12 is covered by a dielectric protective layer 14 followed by a standoff layer 16 and a spacer layer 18. On top of the spacer layer 18, a ribbon layer 20 is formed which is covered by a reflective layer and conductive layer 22. The reflective and conductive layer 22 provides electrodes for the actuation of the conformal GEMS devices 5a and 5b. Accordingly, the reflective and conductive layer 22 is patterned to provide electrodes for the two conformal GEMS devices 5a and 5b. The ribbon layer 20, preferably, comprises a material with a sufficient tensile stress to provide a large restoring force. Each of the two conformal GEMS devices 5a and 5b has an associated elongated ribbon element 23a and 23b, respectively, patterned from the reflective and conductive layer 22 and the ribbon layer 20. The elongated ribbon elements 23a and 23b are supported by end supports 24a and 24b, formed from the spacer layer 18, and by one or more intermediate supports 27 that are uniformly separated in order to form equal-width channels 25. The elongated ribbon elements 23a and 23b are secured to the end supports 24a and 24b and to the intermediate supports 27. A plurality of standoffs 29 is patterned at the bottom of the channels 25 from the standoff layer 16. These standoffs 29 reduce the possibility of the elongated ribbon elements 23a and 23b sticking when actuated.

A top view of a four-device linear array of conformal GEMS devices 5a, 5b, 5c and 5d is shown in FIG. 2. The elongated ribbon elements 23a, 23b, 23c, and 23d are depicted partially removed over the portion of the diagram below the line A—A in order to show the underlying structure in an active region 8. For best optical performance and maximum contrast, the intermediate supports 27 should preferably be completely hidden below the elongated ribbon elements 23a, 23b, 23c, and 23d. Therefore, when viewed from the top, the intermediate supports 27 should not be visible in the gaps 28 between the conformal GEMS devices 5a–5d. Here, each of the conformal GEMS devices 5a–5d has three intermediate supports 27 with four equal-width channels 25. The center-to-center separation Λ of the intermediate supports 27 defines the period of the conformal GEMS devices in the actuated state. The elongated ribbon elements 23a–23d are mechanically and electrically isolated from one another, allowing independent operation of the four conformal GEMS devices 5a–5d. The bottom conductive layer 12 of FIG. 1 can be common to all of the conformal GEMS devices 5a–5d.

FIG. 3a is a side view, through line 3—3 of FIG. 2, of two channels 25 of the conformal GEMS device 5b in an unactuated state. FIG. 3b shows the same view for an actuated state. For operation of the device, an attractive electrostatic force is produced by applying a voltage difference between the bottom conductive layer 12 and the reflective and conductive layer 22 of the elongated ribbon element 23b. In the unactuated state (see FIG. 3a), with no voltage difference (V=0), the ribbon element 23b is suspended flat between the supports. In this state, an incident light beam 30 is primarily reflected into a 0th order light beam 32, as in a simple planar mirror. To obtain the actuated state, a voltage is applied to the conformal GEMS device 5b, which deforms the elongated ribbon element 23b and produces a partially conformal grating with period Λ. FIG. 3b shows the device 5b (as shown and described in FIGS. 1 and 2) in the fully actuated state with the applied voltage at V=$V_{HIGH}$ and the elongated ribbon element 23b in contact with standoffs 29. The height difference between the bottom of element 23b and the top of the standoffs 29 is chosen to be approximately ¼ of the wavelength λ of the incident light. The optimum height depends on the specific conformal shape of the actuated device. In the actuated state, the incident light beam 30 is primarily diffracted into the +1st conformal order 35a and −1st conformal order 35b, with additional light diffracted into the +2nd conformal order 36a and −2nd conformal order 36b. A small amount of light is diffracted into even higher conformal orders and some light remains in the 0th order. In general, one or more of the various beams can be collected and used by an optical system, depending on the application. When the applied voltage is removed, the forces due to tensile stress and bending restores the ribbon element 23b to its original unactuated state, as shown in FIG. 3a.

Figure 4:
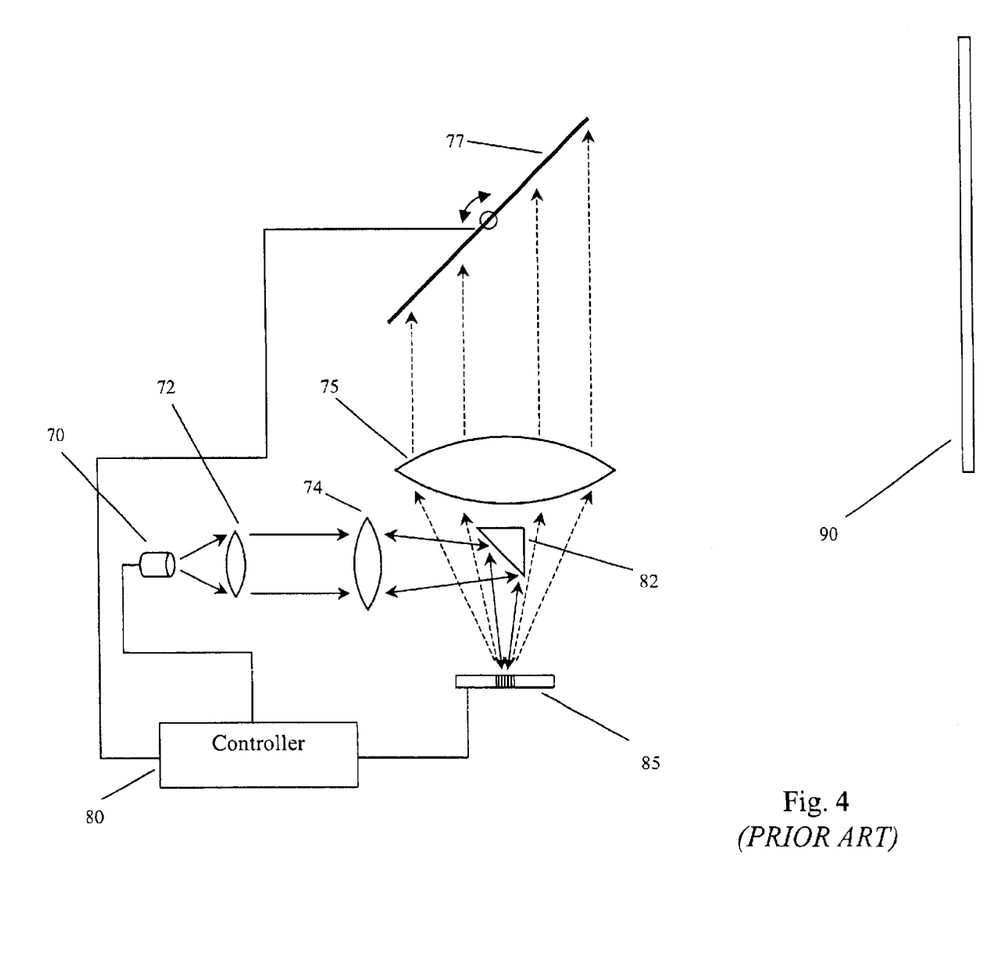
FIG. 4 is a prior art schematic illustrating a line-scanned display system incorporating a linear array of conformal GEMS devices.

FIG. 4 illustrates a display system containing a linear array 85 of conformal GEMS devices, as disclosed in U.S. Pat. No. 6,411,425. Light emitted from a source 70, preferably a laser, is conditioned by a pair of lenses 72 and 74, before hitting a turning mirror 82 and illuminating the linear array 85. The display system forms an entire two-dimensional scene from a scan of a one-dimensional line image of the linear array 85 across the screen 90. The conformal GEMS devices of the linear array 85 are capable of rapidly modulating incident light to produce multiple lines of pixels with gray levels. The controller 80 selectively activates the linear array 85 to obtain the desired pixel pattern for a given line of a two-dimensional scene. If a particular conformal GEMS device is not actuated, it reflects the incident light beam primarily into the 0th order light beam, which is directed back towards the source 70 by the turning mirror 82. If a particular conformal GEMS device is actuated, it diffracts the incident light beams primarily into $+2^{nd}$, $+1^{st}$, $-1^{st}$ and $-2^{nd}$ conformal order beams. These diffracted light beams pass around the turning mirror 82 and are projected on the screen 90 by the projection lens system 75. The scanning mirror 77 sweeps the line image across the screen 90 to form the two-dimensional image. Synchronization between the sweep of the scanning mirror 77 and the image data stream is provided by the controller 80.

Figure 5:
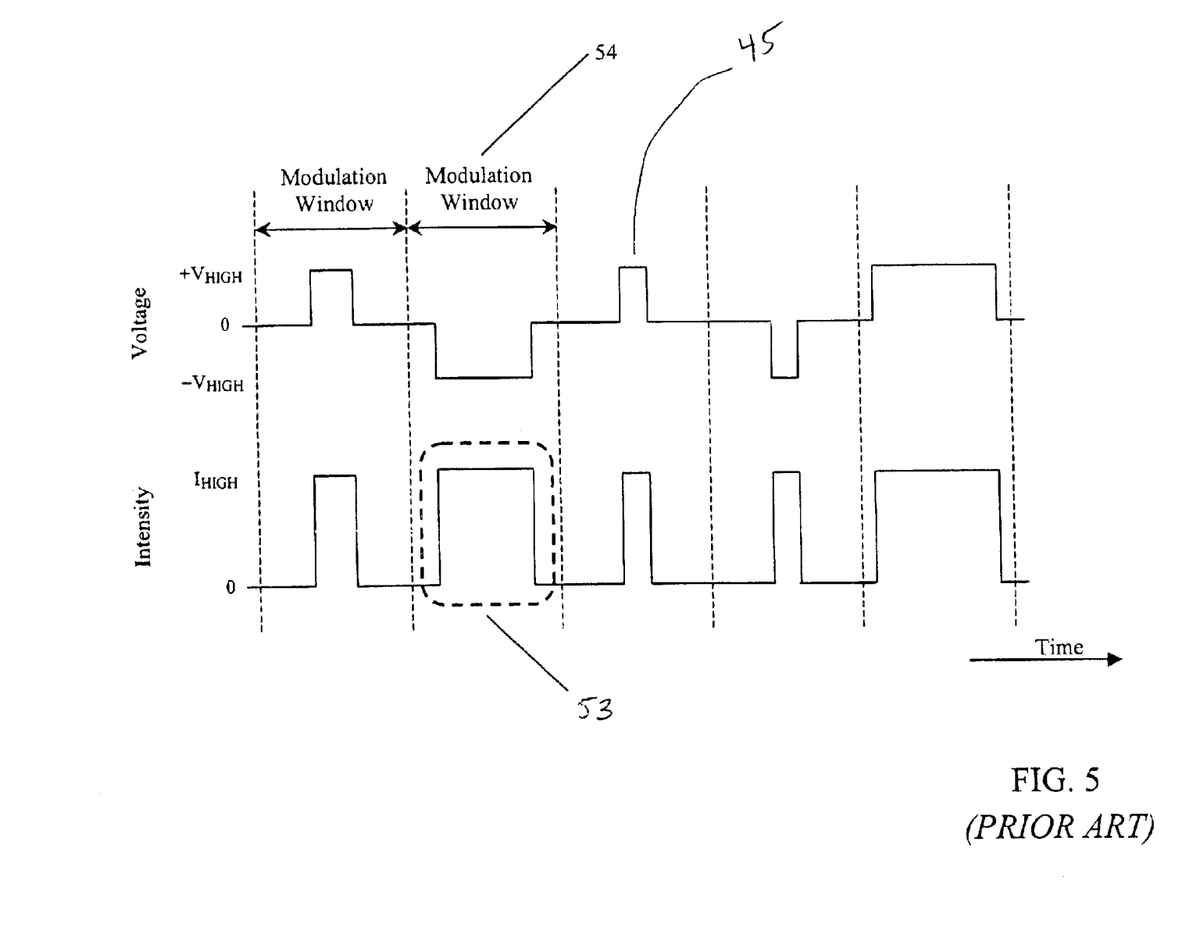
FIG. 5 illustrates prior art formation of gray levels through pulse width modulation.

In order to form gray levels in an image, pulse-width-modulated (PWM) waveforms are applied to the conformal GEMS devices of the linear array 85, as described by Kowarz et al., "Conformal Grating Electromechanical System (GEMS) for High-Speed Digital Light Modulation," IEEE $15^{th}$ International MEMS Conference Technical Digest, pgs. 568–573 (2002). FIG. 5 shows a conventional PWM waveform 45 with voltage $V_{HIGH}$, together with the corresponding device's output (e.g., diffracted light intensity). To obtain a desired gray level, the controller 80 selects the voltage pulse width in each modulation window 54, according to a data stream. When the PWM waveform 45 transitions from 0 V to $V_{HIGH}$, the device (for example, 5a and 5b shown in FIG. 1) actuates and begins diffracting light. When the waveform transitions back to 0 V, the device stops diffracting light. This process is applied to each conformal GEMS device of the linear array 85. For the display system of FIG. 4, the modulation window 54 corresponds to the time used to form a single line of the two-dimensional image. The gray level perceived in a pixel of the image is, therefore, the time-integrated light intensity 53 within the modulation window 54. To minimize charging effects within the device, the applied voltage can be periodically switched between $V_{HIGH}$ and $-V_{HIGH}$ (see U.S. Pat. No. 6,144,481). Since the force on the ribbon elements 23a–23d is independent of polarity, the diffracted light intensity is polarity independent.

Figure 6:
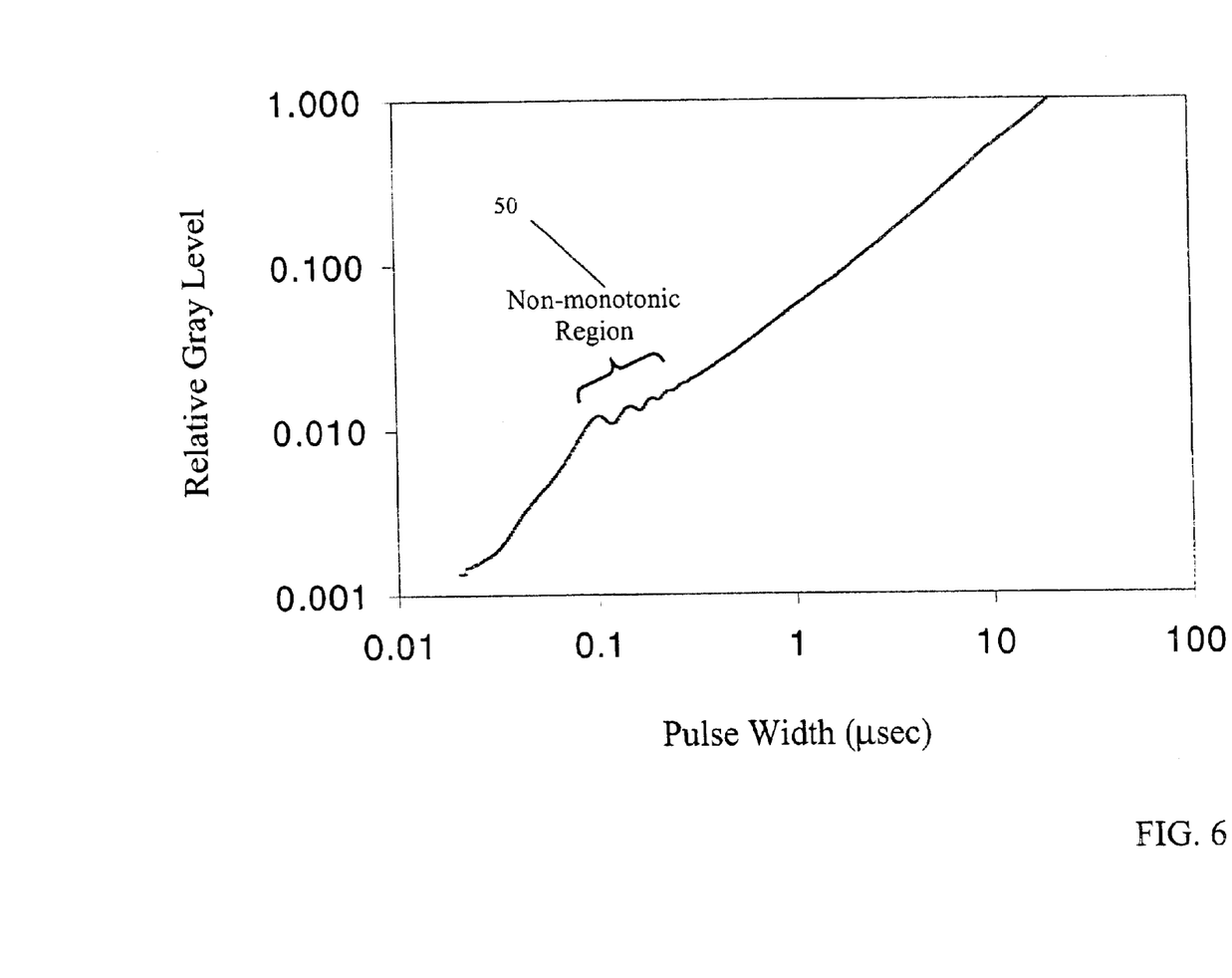
FIG. 6 is a plot showing a gray scale for a conformal GEMS device with gray levels obtained through pulse width modulation.

FIG. 6 shows an example of a gray scale generated using the conventional PWM approach of FIG. 5. In this plot, relative gray levels are shown as a function of pulse width for a modulation window 54 of 20 μsec. When the pulse width is between 0.3 μsec and 20 μsec, the relationship between gray level and pulse width is approximately linear. A non-monotonic (and nonlinear) region 50 is present, however, for pulse widths between approximately 0.1 μsec and 0.3 μsec. This non-monotonic behavior occurs because of the resonant dynamics of the conformal GEMS device. The particular shape of the non-monotonic region 50 depends on a number of factors, including device geometry and driver slew rate. For pulse widths shorter than approximately 0.1 μsec, there is a monotonic, non-linear correspondence between pulse width and gray level. The dark (gray) levels in the non-monotonic region 50 can be difficult to use in practice because of the difficulty in determining the exact correspondence between a desired gray level and the pulse width required to generate that particular gray level.

The techniques described in the prior art for improving gray levels all lower the average optical power incident on the spatial light modulator for some period of time, thus generating multiple illumination levels corresponding to decreased intensity. Multiple illumination levels reduce the speed requirements of the spatial light modulator and its associated electronic components. However, a serious technical drawback to this approach is that it wastes optical power that is available from the light source during lower illumination intervals. Furthermore, for certain types of light sources, reducing the illumination level increases system complexity. The same drawbacks apply when these techniques are used in a display system based on electromechanical grating devices. There is a need, therefore, for a method for generating enhanced gray levels in an electromechanical grating display system that makes efficient use of available optical power and does not significantly increase system complexity.

SUMMARY OF THE INVENTION

The aforementioned need is met according to the present invention by providing an electromechanical conformal grating device that includes at least two sets of elongated ribbon elements; and a pair of end supports for supporting each elongated ribbon element at both ends over a substrate. Also included are a plurality of intermediate supports placed under each elongated ribbon element; and at least two inputs for selectively applying a force to the at least two sets of elongated ribbon elements; wherein the force causes selected elongated ribbon elements to deform between first and second operating states, wherein during the second operating state the elongated ribbon elements mechanically conform to the intermediate supports.

Another aspect of the present invention provides an array of electromechanical conformal grating devices for producing gray levels in an image by light modulation, each electromechanical conformal grating device including at least two sets of elongated ribbon elements; a pair of end supports for supporting each elongated ribbon element at both ends over a substrate; a plurality of intermediate supports placed under each elongated ribbon element and defining a diffraction grating period; and at least two inputs, each input receiving a different modulated waveform that causes selected ribbon elements to conform around the intermediate supports; wherein the different modulated waveforms are derived from an image data stream.

A third aspect of the present invention provides a method for producing gray levels in an image by light modulation with an array of electromechanical conformal grating devices; each electromechanical conformal grating device including at least two sets of elongated ribbon elements and at least two inputs, including the steps of: providing an image data stream; producing at least two modulated waveforms for each electromechanical conformal grating device from the image data stream; and applying the at least two modulated waveforms to the at least two inputs, wherein application of the at least two modulated waveform to the at least two inputs produces gray levels for an image.

A fourth aspect of the present invention provides a light modulation system for producing image gray levels. The light modulation system includes a data source for providing a data stream; and a serial-to-parallel converter for receiving the data stream and transmitting parallel data to parallel data channels. Each parallel data channel includes at least one pulse-width generator and at least two input drivers working in conjunction with the at least one pulse-width generators to produce at least two pulse-width-modulated waveforms. Also included in the light modulation system are a clock for controlling the timing of the at least one pulse-width generators; and an array of electromechanical conformal grating devices for modulating an incident light beam; each electromechanical conformal grating device including at least two sets of elongated ribbon elements and at least two inputs receiving the at least two pulse-width-modulated waveforms from the at least two input drivers.

DETAILED DESCRIPTION OF THE INVENTION

In the present invention, each conformal GEMS device of the linear array is constructed to have at least two inputs instead of a single input. The multiple inputs, in conjunction with appropriate modulated waveforms, are used to improve generation of gray levels in image-forming systems, such as projection displays and printers.

Figure 7:
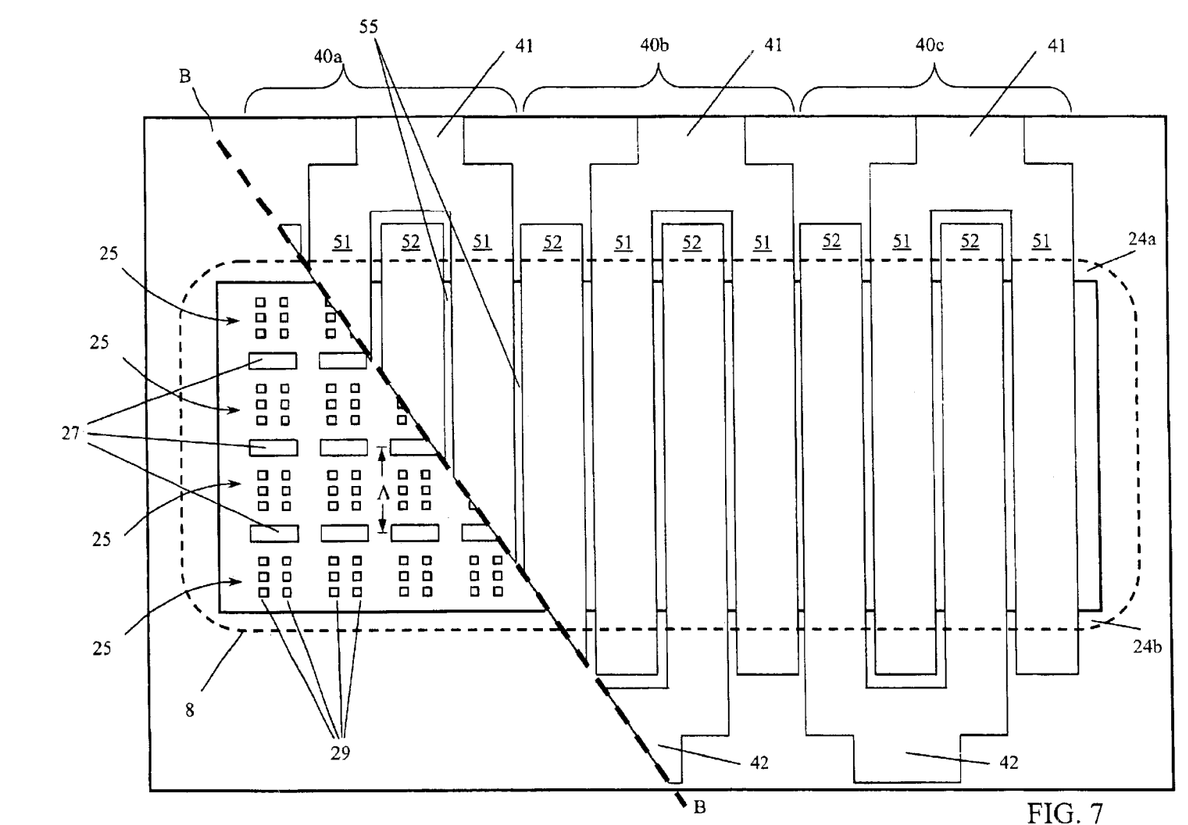
FIG. 7 is a top view of a linear array of dual-input conformal GEMS devices, illustrating the unactuated state.

A top view of a linear array of dual-input conformal GEMS devices, in an unactuated state, is illustrated in FIG. 7. Although only three dual-input conformal GEMS devices 40a, 40b and 40c are shown explicitly in FIG. 7, in practice, there could be a thousand or more devices on the linear array. Each device 40a, 40b and 40c has two inputs 41 and 42. Each of these inputs is connected to a set of elongated ribbon elements. In the embodiment shown in FIG. 7, input 41 is connected electrically to two elongated ribbon elements 51 and input 42 to two elongated ribbon elements 52. The ribbon elements are partially removed below line B—B to illustrate the structure underneath. This underlying structure is very similar to that of the prior art (single-input) conformal GEMS device shown in FIGS. 1–3, including end supports 24a and 24b, channels 25, standoffs 29, and intermediate supports 27 within active region 8. As before, to obtain maximum contrast, the intermediate supports 27 should be completely hidden below the elongated ribbon elements 51 and 52. Therefore, when viewed from the top, the intermediate supports 27 should not be visible in the gaps 55.

Although conformal GEMS devices with multiple ribbon elements were previously disclosed in U.S. Pat. No. 6,307,663, in that disclosure all of the ribbon elements were connected together electrically and addressed by a single input. In the present invention, the ribbon elements associated with a dual-input conformal GEMS device are grouped into two sets, with each set addressed by its own input. Multi-input conformal GEMS devices with more than two sets of elongated ribbon elements and more than two inputs are also possible.

Figure 8:
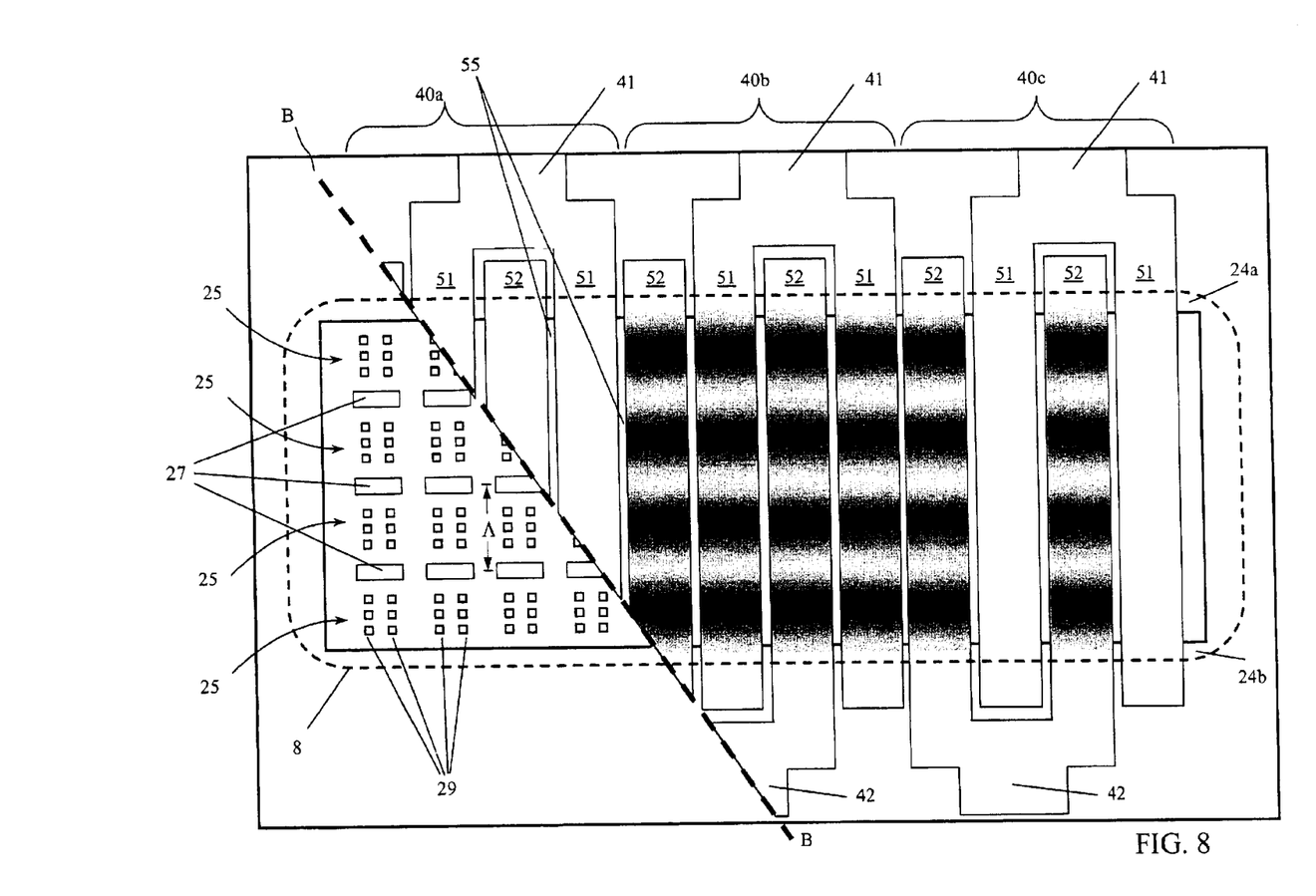
FIG. 8 is a top view of a linear array of dual-input conformal GEMS devices, illustrating different states of actuation.

FIG. 8 is a top view of the dual-input conformal GEMS devices 40a, 40b and 40c of FIG. 7, with a voltage applied to some of the inputs 41 and 42. When any ribbon element is actuated by an applied voltage, the resulting electrostatic force causes it to conform partially around the intermediate supports 27 located underneath. In FIG. 8, the shading on the various ribbon elements represents their profile and state of actuation. Specifically, in device 40a, both inputs 41 and 42 are in the off-state, i. e., there is no applied voltage. All of the elongated ribbon elements 51 and 52 associated with device 40a are, therefore, unactuated and suspended flat above the intermediate supports 27. On the other hand, in device 40b, both inputs 41 and 42 are in the on-state (voltage applied). The elongated ribbon elements 51 and 52 attached to those two inputs are actuated into contact with the standoffs 29. Lastly, device 40c has its two inputs in opposites states, with input 42 in the on-state and the two associated ribbon elements 52 actuated, and input 41 in the off-state and the two associated ribbon elements 51 unactuated.

When illuminated by an incident light beam, preferably a line of laser light, the dual-input conformal GEMS devices 40a, 40b and 40c shown in FIGS. 7 and 8 function either as a mirror, a complete grating or a partial grating, depending on the state of the two inputs 41 and 42. If both inputs 41 and 42 are in the off-state, a dual-input conformal GEMS device 40a–40c behaves like a simple planar mirror that reflects an incident light beam into the $0^{th}$ order. If both inputs 41 and 42 are in the on-state, the device 40a–40c acts as a complete grating with period $\Lambda$ and diffracts the majority of incident light into the $+1^{st}$ and $-1^{st}$ conformal orders. Additional light is diffracted into the $+2^{nd}$ and $-2^{nd}$ conformal orders and higher non-zero conformal orders. In a high-contrast display system, the optics would be designed to capture one or more of these non-zero conformal orders and block all other light. Several of the non-zero conformal orders could be captured if high efficiency is required. With inputs 41 and 42 in opposite states, i. e., one input in the on-state and one input in the off-state, a dual-input conformal GEMS device 40a–40c forms a partial grating with period $\Lambda$. The partial grating configuration, illustrated on device 40c of FIG. 8, has some of the elongated ribbon elements associated with a particular device actuated and others unactuated.

The partial grating configuration is designed to diffract a small portion of incident light into the (non-zero) conformal orders. Specifically, the relative diffraction efficiency into the conformal orders depends on the fill-factor squared of the light-reflecting surface that is in the actuated state. Therefore, for the dual-input conformal GEMS devices 40a–40c of FIGS. 7 and 8, the partial grating configuration has approximately a quarter of the light intensity in conformal orders compared to the complete grating configuration, since only half of the ribbon elements are activated. Light that is not diffracted into the conformal orders is either reflected into the $0^{th}$ order or diffracted into other directions (not shown) blocked by the optical system.

Several different embodiments of dual-input conformal GEMS devices are possible. For example, the two inputs could have different numbers of elongated ribbon elements or the ribbons could have different widths. By proper selection of the ribbon number and ribbon width for each of the two inputs, it is possible to obtain any desired diffraction efficiency ratio between the complete grating and partial grating configurations.

Figure 10:
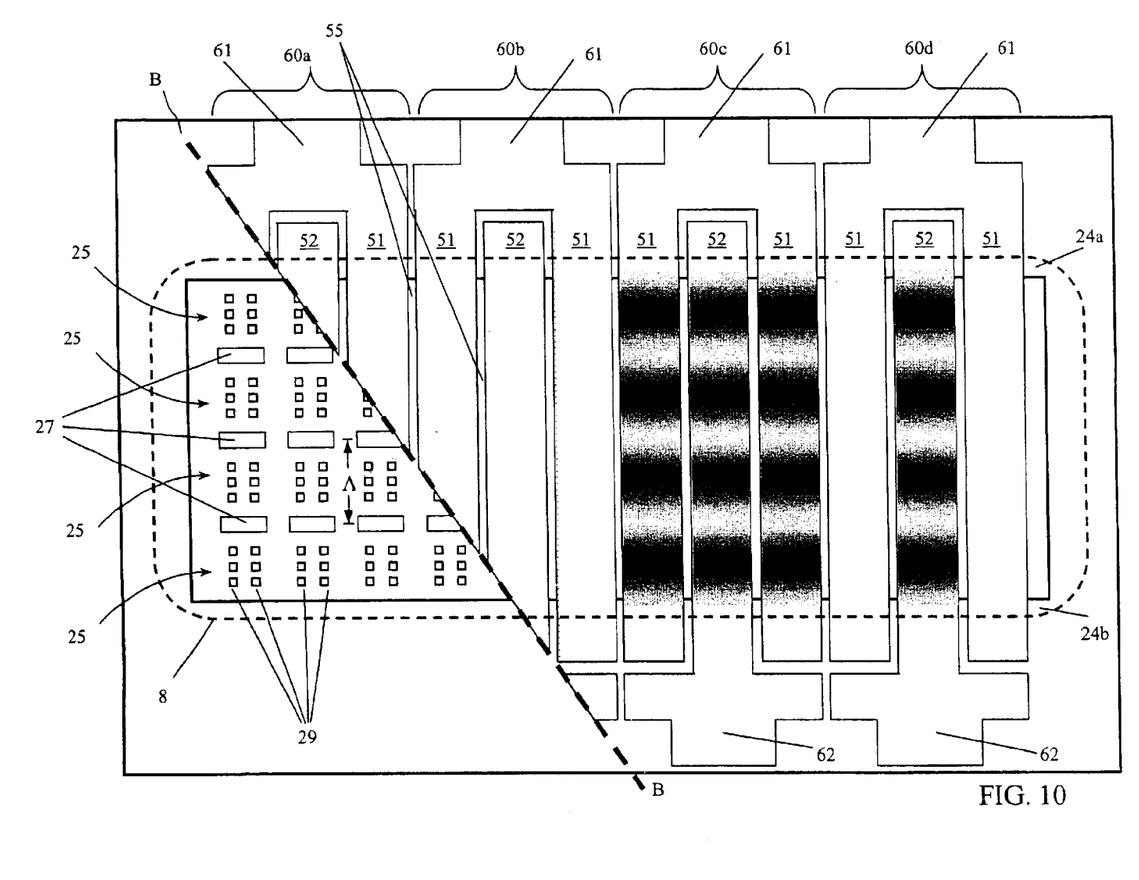
FIG. 10 is a top view of an alternate linear array of dual-input conformal GEMS devices, illustrating different states of actuation.

FIG. 10 illustrates an alternate embodiment in which the light intensity of the conformal orders for the partial grating configuration is approximately one-ninth of that for the complete grating configuration. Four dual-input conformal GEMS devices 60a–60d are shown, each having two inputs 61 and 62. Input 61 is connected to two elongated ribbon elements 51, whereas input 62 is connected to a single elongated ribbon element 52. As depicted in FIG. 10, devices 60a and 60b behave like a mirror, because both inputs 61 and 62 are in the off-state; device 60c functions as a complete grating, because both inputs 61 and 62 are in the on-state; and device 60d functions as a partial grating, because input 61 is in the off-state and input 62 is in the on-state. It should be noted that an alternate partial grating configuration with a different relative efficiency (four-ninths) can also be produced with this embodiment if input 61 is in the on-state and input 62 is in the off-state.

Figure 9:
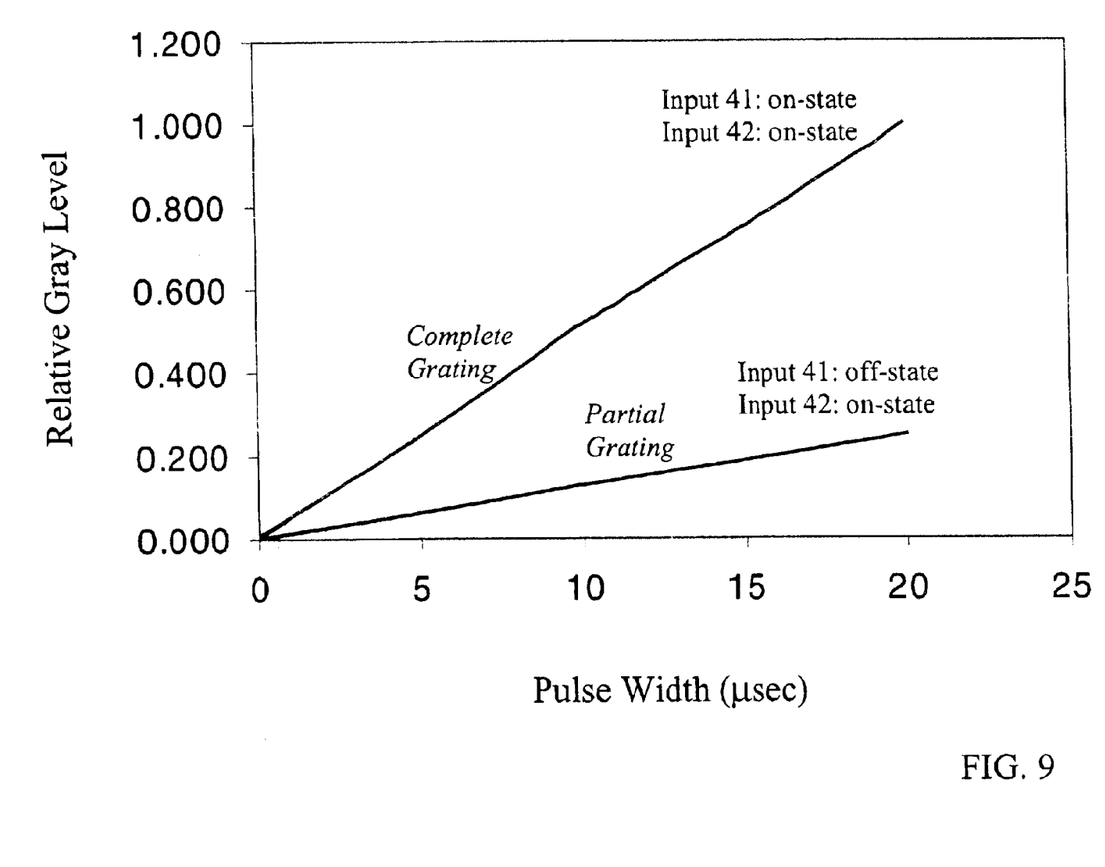
FIG. 9 is a plot showing the gray scale of the dual-input conformal GEMS device of FIGS. 7 and 8.
Figure 11:
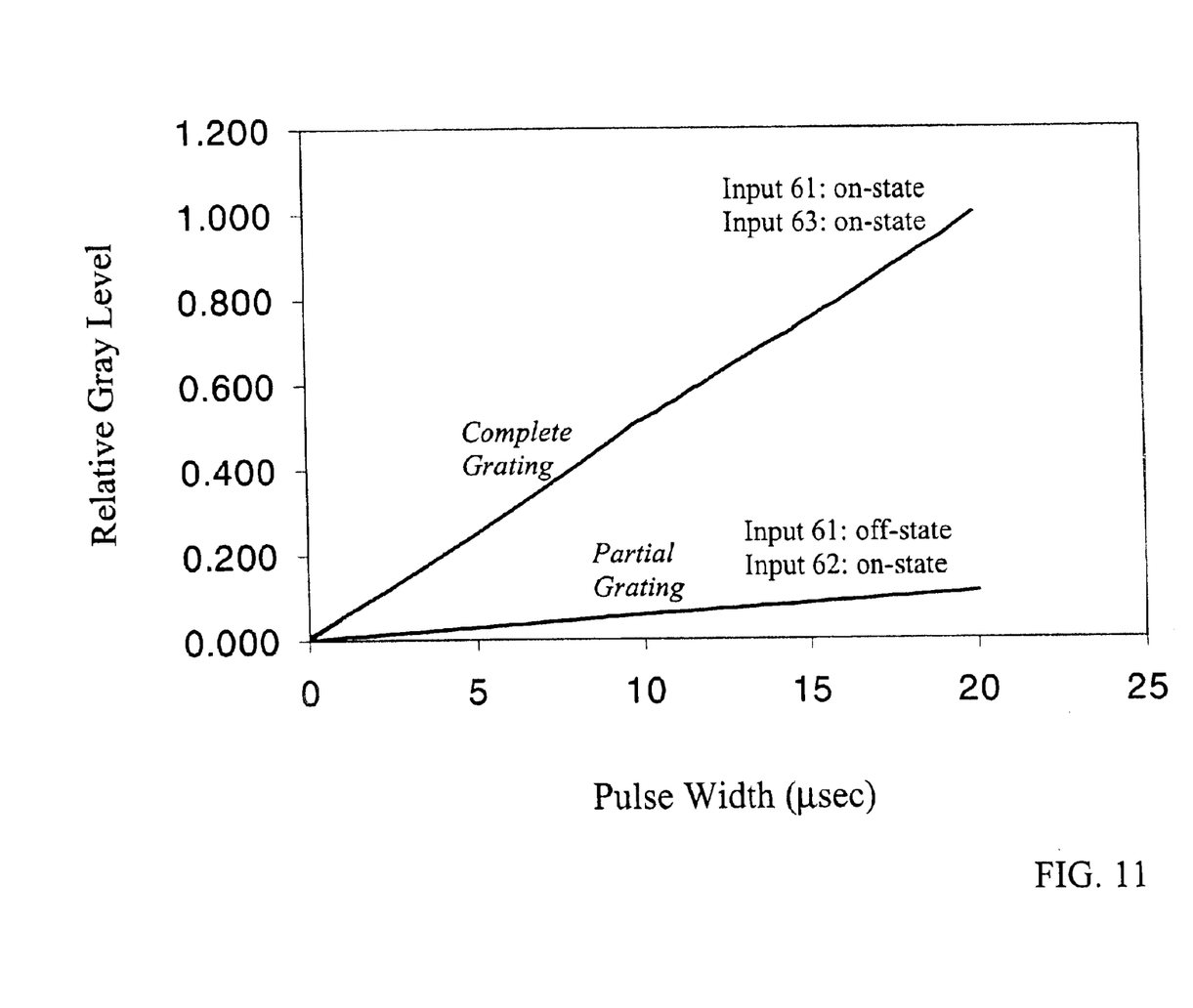
FIG. 11 is a plot showing the gray scale of the dual-input conformal GEMS device of FIG. 10.

As mentioned earlier, by applying appropriate waveforms to dual-input conformal GEMS devices, it is possible to improve gray scale generation. FIGS. 9 and 11 show examples of gray scale formation for the dual-input conformal GEMS devices of FIGS. 8 and 10, respectively. As for single-input conformal GEMS devices, pulse-width-modulated waveforms similar to FIG. 6 are used to generate gray levels. The gray levels then correspond to the time-integrated light intensity of the conformal orders. In FIGS. 9 and 11, gray levels are formed either by applying the same pulse width to both inputs, activating the complete grating configuration, or by applying a pulse to a single input, keeping the other input in the off-state and activating the partial grating configuration. Bright levels in an image are, therefore, generated with both inputs turned on, whereas dark levels are generated with a single input turned on. As is desirable for good images, for a fixed pulse width increment, the spacing between relative gray levels is finer for dark levels than for bright levels. A transition region (not shown), where the gray levels can be formed either with both inputs on or with a single input on, could be used to provide headroom for calibration between the two gray level curves to produce a smooth gray scale. Furthermore, the impact of the non-monotonic region 50 of FIG. 6 can be reduced by activating a single input with the appropriate pulse width to generate the dark levels of interest.

Additional improvements in the gray scale can be obtained by simultaneously applying different pulse widths to the two inputs of a dual-input conformal GEMS device. Unlike the approach of FIGS. 9 and 11, this approach allows the fine gray level spacing to extend from dark levels to bright levels at the expense of greater electronic architecture complexity.

It is instructive to compare the speed requirements of the electronics for a dual-input conformal GEMS device with those for an ordinary (single-input) conformal GEMS device. The system is taken to be a high-quality projection display based on a linear array of devices, with a gray scale formed by pulse width modulation (PWM). Specifically, the system has HDTV resolution with 1,920 scanned lines (1,080 by 1,920 pixels), a frame rate of 60 Hz and a gray scale capability of 13 linear bits per color per flame (8,192 gray levels). For an ordinary conformal GEMS device, the pulse width increment must be somewhat less than 1/(1,920*60*8,192) seconds ~1 nanoseconds to allow for some overhead for scanning the line to form a two-dimensional image. The digital electronics in the controller, therefore, need to generate an effective PWM clock of approximately 1 GHz. This effective clock frequency can be reduced substantially with a dual-input conformal GEMS device, while maintaining the same final system specifications. For example, for the embodiment depicted in FIG. 10, the effective PWM clock frequency can be reduced by a factor of 9 to approximately 111 MHz.

Figure 12:
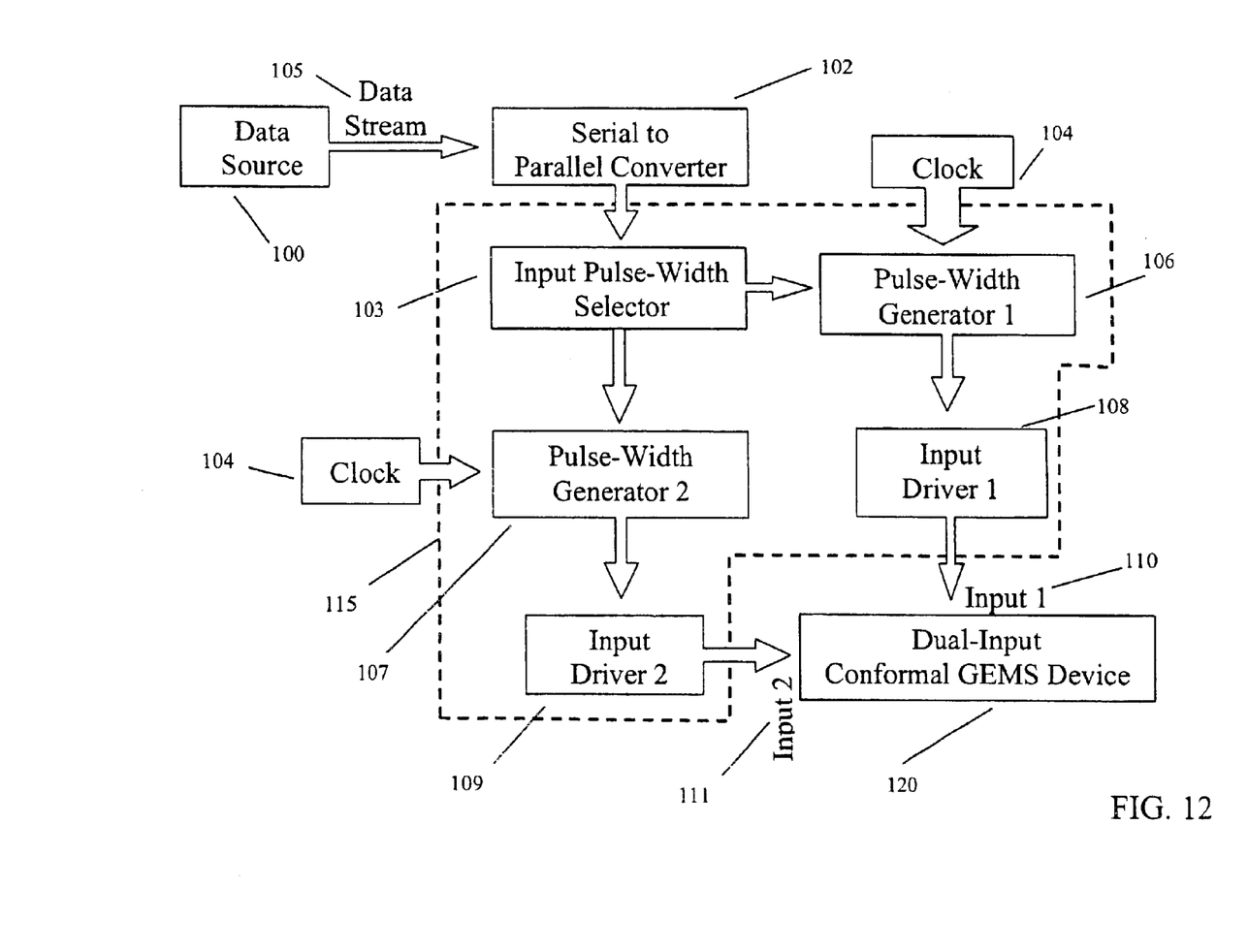
FIG. 12 shows a block diagram of the electronic architecture used to generate two pulse-width-modulated waveforms for driving a dual-input conformal GEMS device.

FIG. 12 shows a block diagram of an electronic architecture that could be used to drive a dual-input conformal GEMS device with pulse-width-modulated waveforms. This particular architecture enables two different pulse widths to be simultaneously applied to the two inputs in order to generate fine gray levels throughout the gray scale. It will be evident to those skilled in the art that this architecture can be simplified if the pulse widths applied to the two inputs are not independent, as in the case of FIGS. 9 and 11. A data source 100 provides a (serial) data stream 105 that has been appropriately preprocessed for generating an image from a linear array of devices. Since each dual-input conformal GEMS device 120 of the linear array requires its own parallel data channel 115, a serial-to-parallel converter 102 is first needed to demultiplex the data stream 105 into parallel data to feed the parallel data channels 115. For example, in the HDTV system mentioned above, there would be 1080 parallel data channels 115 in order to address 1080 dual-input conformal GEMS devices 120, although only one of these parallel data channels 115 is shown in FIG. 12. Each parallel data channel consists of an input pulse-width selector 103, a pair of pulse-width generators 106 and 107 synchronized with clock 104, and a pair of input drivers 108 and 109. The pulse-width selector 103 determines the two pulse widths that need to be applied to the two inputs 110 and 111 of the dual-input conformal GEMS device 120 in order to obtain a desired gray level. These two pulse widths are produced by a pair of high-voltage input drivers 108 and 109 that are controlled digitally by pulse-width generators 106 and 107 and synchronized with clock 104. If ribbon charging is a problem, the pulse-width selector 103 could also be used to select polarity of the pulses applied to the two inputs 110 and 111, in order to generate pulse-width-modulated waveforms that are DC-free.

The invention has been described in detail with particular reference to certain preferred embodiments thereof, but it will be understood that variations and modifications can be effected within the spirit and scope of the invention.

PARTS LIST 5a conformal GEMS device
5b conformal GEMS device
5c conformal GEMS device
5d conformal GEMS device
8 active region
10 substrate
12 bottom conductive layer
14 dielectric protective layer
16 standoff layer
18 spacerlayer
20 ribbon layer
22 reflective and conductive layer
23a elongated ribbon element
23b elongated ribbon element
23c elongated ribbon element
23d elongated ribbon element
24a end support
24b end support
25 channels
27 intermediate supports
28 gaps
29 standoffs
30 incident light beam
32 $0^{th}$ order light beam
35a $+1^{st}$ conformal order
35b $-1^{st}$ conformal order
36a $+2^{nd}$ conformal order
36b $-2^{nd}$ conformal order
40a dual-input conformal GEMS device
40b dual-input conformal GEMS device
40c dual-input conformal GEMS device
41 inputs
42 inputs
45 conventional PWM waveform
50 non-monotonic region
51 elongated ribbon elements
52 elongated ribbon elements
53 time-integrated light intensity
54 modulation window
55 gaps
60a dual-input conformal GEMS device
60b dual-input conformal GEMS device
60c dual-input conformal GEMS device
60d dual-input conformal GEMS device
61 inputs
62 inputs
70 source
72 spherical lens
74 cylindrical lens
75 projection lens system
77 scanning mirror
80 controller
82 turning mirror
85 linear array
90 screen
100 data source
102 serial-to-parallel converter
103 input pulse-width selector
104 clock
105 data stream
106 pulse-width generator
107 pulse-width generator
108 input driver
109 input driver
110 input
111 input
115 parallel data channels
120 dual-input conformal GEMS device

What is claimed is:

1. An electromechanical conformal grating device comprising:

a) at least two sets of elongated ribbon elements;

b) a pair of end supports for supporting each elongated ribbon element at both ends over a substrate;

c) a plurality of intermediate supports placed under each elongated ribbon element; and d) at least two inputs for selectively applying a force to the at least two sets of elongated ribbon elements; wherein the force causes selected elongated ribbon elements to deform between first and second operating states, wherein during the second operating state the elongated ribbon elements mechanically conform to the intermediate supports.

2. The electromechanical conformal grating device claimed in claim 1, wherein a diffraction grating period is determined by the placement of the intermediate supports.

3. The electromechanical conformal grating device claimed in claim 1, wherein during the first operating state, the selected elongated ribbon elements are suspended flat between the intermediate supports.

4. The electromechanical conformal grating device claimed in claim 1, wherein there are only two inputs for selectively applying the force.

5. The electromechanical conformal grating device claimed in claim 4, when the two inputs are in an off-state, the electromechanical conformal grating device functions as a planar mirror.

6. The electromechanical conformal grating device claimed in claim 4, when the two inputs are both in an on-state, the electromechanical conformal grating device functions as a complete grating.

7. The electromechanical conformal grating device claimed in claim 4, when the two inputs are in opposite states, the electromechanical conformal grating device functions as a partial grating with a diffraction efficiency less than a complete grating.

8. The electromechanical conformal grating device claimed in claim 1, wherein pulse-width-modulated waveforms are applied to the at least two inputs.

9. The electromechanical conformal grating device claimed in claim 1, wherein the elongated ribbon elements are supported under tension.

10. The electromechanical conformal grating device claimed in claim 1, wherein the force is an electrostatic force.

11. The electromechanical conformal grating device claimed in claim 1, wherein the at least two sets of elongated ribbon elements include the same number of elongated ribbon elements per set.

12. The electromechanical conformal grating device claimed in claim 1, wherein the at least two sets of elongated ribbon elements include different numbers of elongated ribbon elements per set.

13. The electromechanical conformal grating device claimed in claim 1, wherein all of the elongated ribbon elements have an equal width.

14. The electromechanical conformal grating device claimed in claim 1, wherein the elongated ribbon elements make contact with an underlying structure during the second operating state.

15. An array of electromechanical conformal grating devices for producing gray levels in an image by light modulation, each electromechanical conformal grating device comprising:
   a) at least two sets of elongated ribbon elements;
   b) a pair of end supports for supporting each elongated ribbon element at both ends over a substrate;
   c) a plurality of intermediate supports placed under each elongated ribbon element and defining a diffraction grating period; and
   d) at least two inputs, each input receiving a different modulated waveform that causes selected ribbon elements to conform around the intermediate supports; wherein the different modulated waveforms are derived from an image data stream.

16. The array of electromechanical conformal grating devices claimed in claim 15, wherein the at least two sets of elongated ribbon elements include the same number of elongated ribbon elements per set.

17. The array of electromechanical conformal grating devices claimed in claim 15, wherein the at least two sets of elongated ribbon elements include different numbers of elongated ribbon elements per set.

18. The array of electromechanical conformal grating devices claimed in claim 15, wherein there are only two inputs for each electromechanical grating device.

19. The array of electromechanical conformal grating devices claimed in claim 18, when the two inputs are in an off-state, the electromechanical conformal grating device functions as a planar mirror.

20. The array of electromechanical conformal grating devices claimed in claim 18, when the two inputs are both in an on-state, the electromechanical conformal grating device functions as a complete grating.

21. The array of electromechanical conformal grating devices claimed in claim 18, when the two inputs are in opposite states, the electromechanical conformal grating device functions as a partial grating with a diffraction efficiency less than a complete grating.

22. The array of electromechanical conformal grating devices claimed in claim 15, wherein the modulated waveforms are pulse width modulated.

23. The array of electromechanical conformal grating devices claimed in claim 18, wherein bright gray levels are produced when the two inputs are in the on-state.

24. The array of electromechanical conformal grating devices claimed in claim 18, wherein dark gray levels are produced when the two inputs are in opposite states.

25. The array of electromechanical conformal grating devices claimed in claim 15, wherein all of the elongated ribbon elements have an equal width.

26. The array of electromechanical conformal grating devices claimed in claim 21, wherein the diffraction efficiency of the partial grating is at most one quarter relative to the complete grating.

27. A method for producing gray levels in an image by light modulation with an array of electromechanical conformal grating devices; each electromechanical conformal grating device including at least two sets of elongated ribbon elements and at least two inputs, comprising the steps of:
   a) providing an image data stream;
   b) producing at least two modulated waveforms for each electromechanical conformal grating device from the image data stream; and
   c) applying the at least two modulated waveforms to the at least two inputs, wherein application of the at least two modulated waveform to the at least two inputs produces gray levels for an image.

28. The method claimed in claim 27, wherein the at least two sets of elongated ribbon elements include the same number of elongated ribbon elements per set.

29. The method claimed in claim 27, wherein the at least two sets of elongated ribbon elements include different numbers of elongated ribbon elements per set.

30. The method claimed in claim 27, wherein there are only two inputs for receiving the modulated waveform.

31. The method claimed in claim 30, when the two inputs are in an off-state, the electromechanical conformal grating device functions as a planar mirror.

32. The method claimed in claim 30, when the two inputs are both in an on-state, the electromechanical conformal grating device functions as a complete grating.

33. The method claimed in claim 30, when the two inputs are in opposite states, the electromechanical conformal grating device functions as a partial grating with a diffraction efficiency less than a complete grating.

34. The method claimed in claim 27, wherein the at least two modulated waveforms are pulse width modulated.

35. The method claimed in claim 30, wherein bright gray levels are produced when the two inputs are in the on-state.

36. The method claimed in claim 30, wherein dark gray levels are produced when the two inputs are in the opposite states.

37. The method claimed in claim 27, wherein all of the elongated ribbon elements have an equal width.

38. The method claimed in claim 33, wherein the diffraction efficiency of the partial grating is at most one quarter relative to the complete grating.

39. A light modulation system for producing image gray levels, comprising:
   a) a data source for providing a data stream;
   b) a serial-to-parallel converter for receiving the data stream and transmitting parallel data to parallel data channels;
   c) at least one pulse-width generator for each parallel data channel;
   d) at least two input drivers for each parallel data channel; the at least two input drivers working in conjunction with the at least one pulse-width generator to produce at least two pulse-width-modulated waveforms;
   e) a clock for controlling the timing of the at least one pulse-width generators; and
   f) an array of electromechanical conformal grating devices for modulating an incident light beam; each electromechanical conformal grating device including at least two sets of elongated ribbon elements and at least two inputs receiving the at least two pulse-width-modulated waveforms from the at least two input drivers.

40. The light modulation system claimed in claim 39, wherein each electromechanical grating device has only two inputs receiving two pulse-width-modulated waveforms.

41. The light modulation system claimed in claim 40, wherein bright gray levels in an image are produced when the two inputs are in the on-state.

42. The light modulation system claimed in claim 40, wherein dark gray levels in an image are produced when the two inputs are in opposite states.

43. The light modulation system claimed in claim 40, wherein there are two pulse-width generators for producing the two pulse-width-modulated waveforms.

44. The light modulation system claimed in claim 43, wherein the two pulse-width-modulated waveforms can simultaneously have different pulse widths.

45. The light modulation system claimed in claim 43, further comprising a pulse-width selector for choosing pulse widths of the two pulse-width generators.

46. The light modulation system claimed in claim 39, wherein the pulse-width-modulated waveforms have selectable polarities.

* * * * *